Dec. 11, 1956     K. F. ROSS     2,774,065
RADIO LOCATION SYSTEM

Filed Sept. 26, 1950     3 Sheets—Sheet 1

INVENTOR.
Karl F. Ross

Dec. 11, 1956  K. F. ROSS  2,774,065
RADIO LOCATION SYSTEM
Filed Sept. 26, 1950  3 Sheets-Sheet 2

INVENTOR.
Karl F. Ross

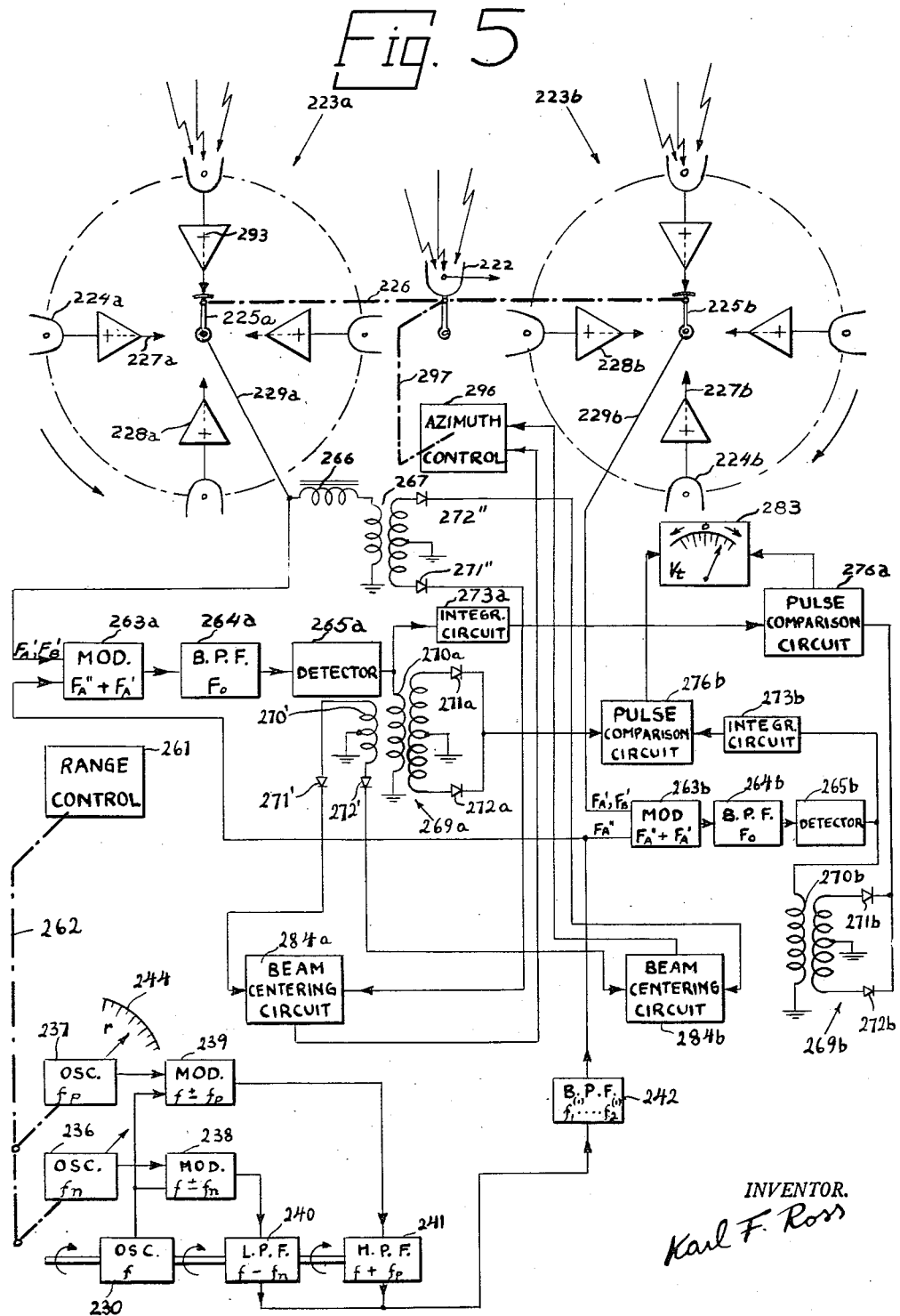

2,774,065
RADIO LOCATION SYSTEM

Karl F. Ross, New York, N. Y.

Application September 26, 1950, Serial No. 186,694

15 Claims. (Cl. 343—9)

My invention relates to radio location systems using the echo method, generally known today as "radar" systems.

A few distinct systems of target location by the echo method are in general use. In one arrangement, employed in altimeters and in certain aerial or maritime warning systems, a steady wave of continuously varying frequency is emitted and the difference in frequency between the transmitted and the received wave serves as an indication of the distance of the nearest reflecting object (which may be the ground, or an approaching craft). In another system, pulses are sent out in a highly directive pattern and at intervals long enough to enable the reception of an echo pulse from a target lying within the range to be covered, whereby a panoramic view of all the targets lying within a given range, together with information concerning the distance and azimuth of such targets, may be obtained on the cathode ray screen of an indicator. A third application of the echo method involves the emission of a wave of constant frequency and the comparison of its frequency with that of an incoming reflected wave, whereby information as to the radial speed of a reflecting object (without, however, any indication concerning its range or direction) becomes available to the observer.

An object of the present invention is to provide a method of and means for selectively receiving echoes only from targets located in a limited area centered about a reference point of known position.

More particularly, it is an object of the invention to provide a method of and means for selectively receiving information from a selected target notwithstanding the presence of other targets positioned closer to the observer.

Another object of the invention is to provide a method of and means for ascertaining the radial and/or the tangential speed of a moving target known or suspected to be present in a certain area remote from the observer.

It is also an object of the instant invention to provide a method of and means for maintaining a radio location system trained upon a moving target whose radial and/or tangential speed is being determined or which is otherwise kept under observation.

The invention, utilizing certain principles of the systems referred to above in such manner and in combination with such novel features as to achieve results attainable by none of these systems, essentially involves the emission of a steady wave of continuously varying frequency preferably in a directive pattern, the receiving of reflected waves, the modulation of the received waves with a local oscillation of continuously varying frequency bearing a selectively fixed relation to the frequency of the emitted wave, and the filtering of the modulation products between narrow frequency limits; the oscillations obtained by the filtering process are then the product of reflection from targets located within a ring or a ring segment comprised between narrow radial limits, the angular extent of the segment being determined by the directive pattern of transmission and/or reception.

For a better understanding of the invention and a detailed description of certain embodiments thereof, reference is being had to the accompanying drawing in which:

Fig. 5 is a circuit diagram representing a modification.

Figure 1:
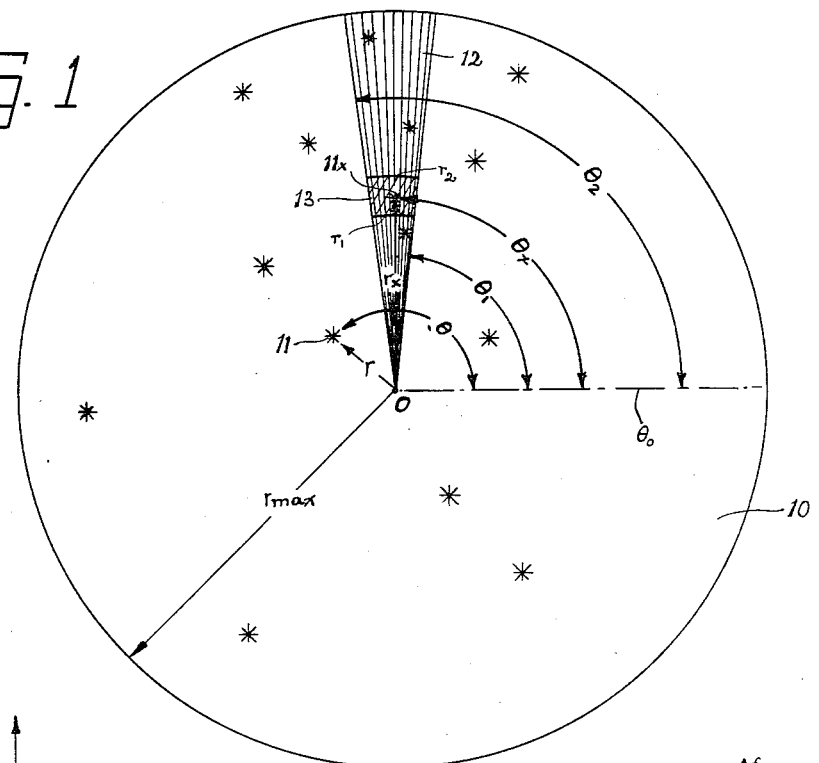
Fig. 1 illustrates the information obtained from a conventional panoramic indicator, revealing the presence of a number of targets upon which a speed detector according to the present invention may be selectively trained.

In Fig. 1 there has been shown the viewing screen 10 of a panoramic indicator of known type, using pulse echo detection, whereon the traces 11 reveal the presence of a number of scattered targets whose positions are defined by the radius $r$ and the azimuth angle $\theta$ with respect to the observer's position O and to an arbitrary reference line designated $\theta_0$. Let it be assumed that it is desired to make an instantaneous determination of the speed and direction of movement of a target $11_x$, having the coordinates $r_x$ and $\theta_x$, whose actual velocity in relation to its distance from the observer is such that these data could be visually ascertained only after prolonged observation of its trace on the screen 10.

Figure 2:
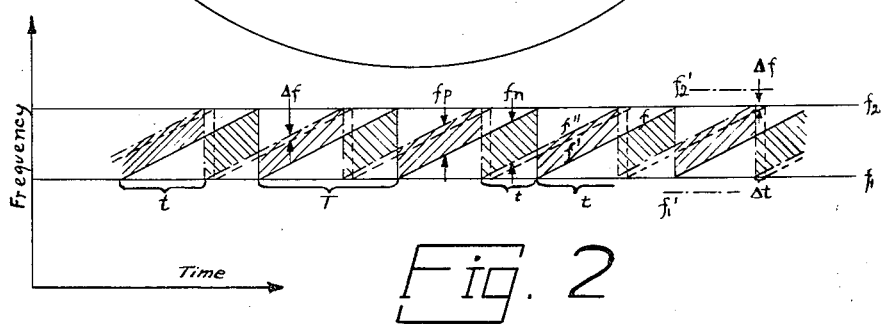
Fig. 2 is a graphic diagram used in explaining the method of focusing a detector according to the invention upon a selected target and of determining the radial velocity thereof.

A sectoral area 12, which encompasses the target $11_x$ and extends between the azimuth angles $\theta_1$ and $\theta_2$, is now directively explored by the transmission of an ultra-high-frequency wave and reception thereof after reflection by the target. It is to be understood that such directive exploration may be accomplished by directive transmission, directive reception or, preferably, both. The frequency of the emitted wave, denoted $F_A$, is composed of a fixed carrier component $F$ and a variable or modulating component $f$, the latter varying according to a sawtooth pattern of period T as illustrated in Fig. 2. It will be noted that $f$ rises gradually from a lower limit $f_1$ to an upper limit $f_2$ whence it instantaneously returns to $f_1$, the magnitude of the latter value being sufficient to enable ready separation of the side bands $F+f_1-f_1$.

If, now, $F_A = F+f$, there will be received a reflected wave of frequency $F_A' = F+f'$, the magnitude of $f'$ varying according to the same sawtooth pattern as that of frequency $f$ but with a time lag $t$ in respect thereto which is a function of the distance $r$ of the reflecting target as given by the formula $$t = \frac{2r}{c}$$

wherein $c$ is the velocity of propagation of the radio waves, it being assumed for the present that the target has no radial velocity of its own.

Since the distance $r_x$ of the selected target $11_x$ is at least approximately determinable from the indication appearing on the screen 10, it will now be possible to synthesize at the receiver a local oscillation of frequency $F_A'' = F_0 - F - f''$ wherein $f''$ is a varying frequency following the pattern of frequency $f$ with a time lag substantially equal to $t$, $F_0$ being a high-frequency component of fixed magnitude. Upon adding the frequency $F_A''$ to the bundle of received frequencies which differ in their instantaneous magnitudes in accordance with the ranges of the reflecting objects, and which include the frequency $F_A'$ due to reflection at the target $11_x$, there will be produced a resulting frequency $$F_1 = F_A'' + F_A' = F_0 + (f' - f'')$$

this frequency being very near $F_0$ since $f''$ has been deliberately selected to make $f'-f''\equiv\Delta f$ as close to zero as possible; this will be apparent from Fig. 2 from which it will be noted that $\Delta f$ is constant and small throughout almost the entire length of each sawtooth of the graphs $f'$, $f''$ (with the exception of a very short interval $\Delta t$ at the end of each sawtooth which tends to disappear upon $f''$ approaching $f'$). If, therefore, the modulation products are now applied to a narrow-band-pass filter centered on $F_0$, only wave energy resulting from reflection at a target within the ring segment 13 (Fig. 1) will be passed; the boundaries of this segment are the radii $r_1$ and $r_2$, determined by the lower and upper cutoff frequencies of the band pass filter, and the azimuth angles $\theta_1$ and $\theta_2$ established by the radiation pattern of the transmitting and/or receiving antennas.

From Fig. 2 it will further be apparent that the introduction of a time lag $t$ to produce the frequency $f''$, taking the frequency $f$ as a reference value, is equivalent to the combination of $f$ with a frequency $+f_p$ throughout a time interval of length $t$ (shown hatched from upper right to lower left) and to the combination of $f$ with a frequency $-f_n$ throughout a time interval of length $T-t$ (shown hatched from upper left to lower right), the sum of these frequencies $f_p$ and $f_n$ being equal to the difference of the limiting frequencies $f_2$ and $f_1$. If $T \gg t_{max}$, $t_{max}$ being equal to $2r_{max}/c$ wherein $r_{max}$ is the maximum operating range as shown in Fig. 1, then $f''$ will for practical purposes be always equal to $f-f_n$ so that $f_p$ may be disregarded. If, on the other hand, $T$ approaches its lower limit $t_{max}$ (as shown in Fig. 2), then $f''$ may be synthesized by combining $f$ with both $-f_n$ and $+f_p$, the proper selection between these two frequencies being made with the aid of a band pass filter as more fully described hereinafter with reference to Fig. 5.

If the target $11_x$ is no longer stationary but has an inherent radial velocity $v_r$, the expression for the reflected frequency $F_A'$ will be modified by the apparent addition of a frequency $f_x$ (which may be of positive or of negative sign), so that $F_A'=F+f'+f_x$ and $$F_I=F_0+\Delta f+f_x,$$

the last member being a measure of the radial speed $v_r$. It will be understood that $f_x$ will be very small compared to $F_0$, so that $F_I$ will still fall within the pass band of the filter; determination of $v_r$ from the magnitude of $F_I$ alone will, however, be difficult if not impossible inasmuch as $f_x$, in the absence of an absolutely accurate determination of $r_x$, will for practical purposes be indistinguishable from $\Delta f$.

In order to isolate $f_x$ and $\Delta f$, a second wave $F_B=F-f$ is emitted simultaneously with $F_A$, as the result of which the received frequencies include a frequency $$F_B'=F-f'+f_x$$

When a local oscillation $F_B''=F_0+F-f''$ is mixed with the received frequencies, there may be filtered from the modulation products a resulting frequency $$F_{II}=F_B''-F_B'=F_0+\Delta f-f_x$$

It will thus be seen that it is possible to eliminate either $\Delta f$ or $f_x$ by subtractively or additively combining $F_I$ and $F_{II}$, and the two measures may be used separately to provide different types of information as more fully described hereinafter.

It may be mentioned that the local oscillations may also be given the forms $F_A''=F_0+F+f''$ and $$F_B''=F_0-F+f''$$

the important condition being that the two frequencies differ by the components $F$, $f''$ being of the same sign in $F_A''$ and of opposite sign in $F_B''$.

Figure 3:
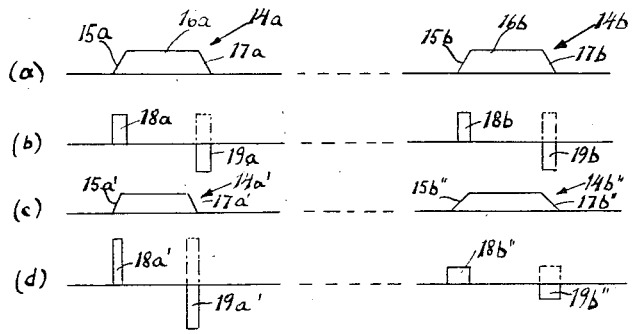
Fig. 3 is a graphic diagram used in explaining the method of determining the tangential velocity of a selected target.

Since the method outlined above enables, in effect, the selective training of a scanning beam upon a moving or stationary object located anywhere within the area under observation, and since reflections from other objects also in the area are prevented from producing an output at the receiver, it will now be possible to determine any tangential displacement of the selected target with the aid of an angular scanning sweep; it is to be noted that such a sweep may be produced by angularly displacing a transmitting and/or a receiving antenna having the required degree of directivity. Thus if ultra-high-frequency energy from a transmitting antenna is reflected by the target toward a receiving antenna, and if either or both antennas are highly directive and are oscillated to sweep back and forth across the position of the target, the output of the receiving antenna will be roughly in the form of a succession of trapezoidal pulses 14a, 14b as shown in Fig. 3 (a), the odd-numbered pulses 14a occurring upon the sweep proceeding in one direction and the even-numbered ones 14b upon its proceeding in the other direction. Each pulse 14a, 14b consists of a rising flank 15a, 15b, respectively, occurring when the target enters the major lobe of the directive antenna pattern; a substantially flat top 16a, 16b, respectively, occurring while the target is covered by the lobe; and a declining flank 17a, 17b, respectively, occurring when the lobe leaves the target. If the width of the lobe, which for convenience will be referred to as beam width, substantially exceeds the angular extent of the target, then the shape of the pulses 14a, 14b will not be materially affected by the shape of the target but will depend only upon the configuration of the directive pattern; thus a symmetrical pattern will result in a symmetrical pulse as illustrated in the drawing.

Differentiation of each pulse 14a, 14b yields a pair of rectangular pulses 18a, 19a and 18b, 19b, Fig. 3 (b), whose amplitudes are a measure of the steepness of the flanks 15a, 16a and 15b, 16b, respectively, and which by an inversion process (as indicated in dot-dash lines) may be caused to be of the same magnitude and sign. As long as the tangential velocity of the selected target is zero, not only the original pulses 14a, 14b but also their derivatives 18a, 18b and 19a, 19b will be alike as shown by the graphs (a) and (b) of Fig. 3.

Graphs (c) and (d) of Fig. 3 illustrate the case when the target has a tangential speed component in the direction of the even-numbered sweeps of the scanning beam, i. e. of the sweeps giving rise to the pulses 14b in Fig. 3(a). As a result of this speed component the pulses in the output of the receiving antenna appear alternately contracted, as illustrated at 14a' in Fig. 3(c), and expanded, as illustrated at 14b'' in the same graph. At the same time the angle of inclination of the flanks 15a', 17a' of the first pulse is increased while that of the flanks 15b'', 17b'' is decreased, this in turn leading to an increase in the amplitude of the derived pulses 18a', 19a' over that of derived pulses 18b'', 19b'' as illustrated in Fig. 3(d).

It will thus be seen that an indication of the extent and the sense of the tangential speed of the selected target $11_x$ may already be obtained from a single set of pulses, such as the pulses 14a, by comparing either their area (result of integration) or their flank steepness (result of differentiation), or the ratio thereof, with a suitable standard, e. g. with the corresponding properties of a pulse derived from a reference object known to be stationary. It will be understood, however, that a more positive method of producing such an indication consists in comparing two sets of pulses such as 14a, 14b which are derived from the same target but which are oppositely affected by a given movement thereof, and that the reliability of the information so obtained may be greatly increased by taking into account both the ratio of their integrals and the ratio of their derivatives, one of these ratios becoming greater and the other less than unity as a result of the angular displacement of the target.

The use of a single oscillating (transmitting or receiving) antenna to obtain both pulses 14a and 14b has the advantage of enabling stricter comparison since the two pulses will both pass through the same radiator and pick-up system. On the other hand, it will also be possible to derive these pulses from separate antennas continuously rotating in opposite directions, such an arrangement being preferable where it is desired to receive the pulses at a faster rate than would be possible in practice with an oscillatory system.

It will be of interest that the system according to the invention as hereinabove disclosed, and as more specifically outlined in the following description of Figs. 4 and 5, does not require an antenna system of extremely high directivity for satisfactory operation. This will be true because the spacing of moving targets will generally be considerably greater than their own size, so that a beam width substantially exceeding that of the beam required to produce the traces 11 on the screen 10 (Fig. 1) will suffice, as shown at 12. If, on the other hand, the target is one of several closely packed craft moving in formation, then the entire group of craft will have the same radial and tangential speed and may, therefore, be treated as a single moving object of large dimensions. Accordingly, it will be possible to utilize the ability of longer waves to get around screening objects and the problem of designing the required oscillators, modulators and amplifiers will be simplified.

Figure 4:
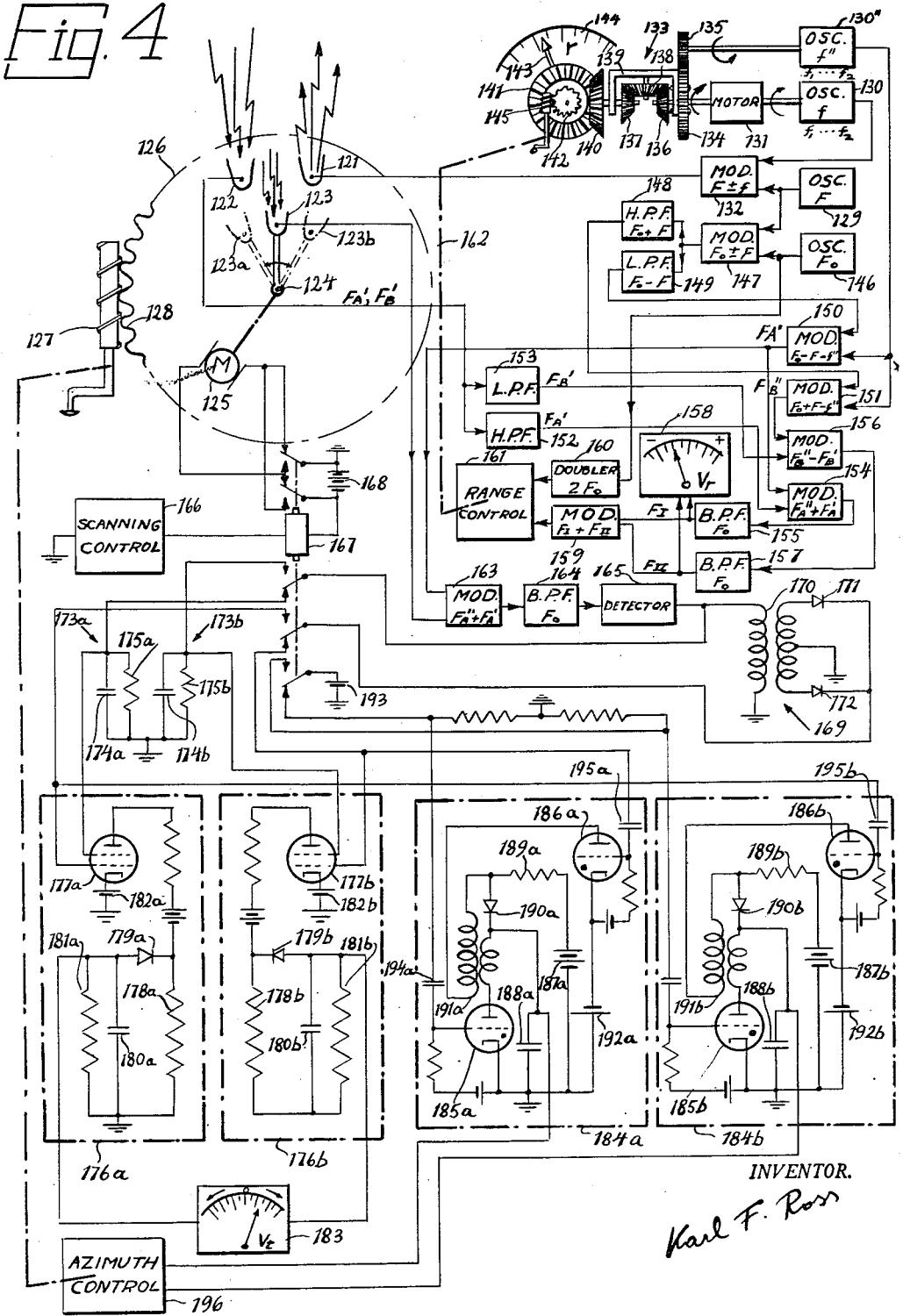
Fig. 4 is a circuit diagram, partly in block form, representing an embodiment of the invention.

Referring now to Fig. 4, there is shown a directive transmitting antenna 121, a directive receiving antenna 122 pointing in the same direction, as well as another directive receiving antenna 123 oscillatable about a pivot 124 under the control of a reversible motor 125. Antennas 121, 122 and 123 as well as motor 125 are mounted on a common platform 126 which may be rotated to change the directional orientation of the entire transmitting and receiving system without varying the relative position of the antennas, rotation of this platform being effected either manually or (as more fully described hereinafter) automatically through the intermediary of a worm 127 engaging a set of peripheral teeth 128 provided on the platform 126.

The radiant energy emitted by the antenna 121 is supplied by a fixed oscillator 129, which produces the constant frequency F, and by a variable oscillator 130 which is driven by a motor 131 to produce the constantly varying frequency $f$; the outputs of both oscillators are combined in a modulator 132 which produces both sidebands $F+f$ and $F-f$ representing the outgoing frequencies $F_A$ and $F_B$, respectively.

Motor 131 also drives a second variable oscillator 130″ which is identical with oscillator 130 and produces the frequency $f''$, the two oscillators being positively coupled together and to the motor by means of differential gearing 133 and a pair of step-up gears 134, 135 of ratio 2:1. The differential gearing 133 comprises planet wheels 136, 137, sun wheel 138 and housing 139, the larger gear 134 being rigid with the housing 139. Planet wheel 136 is coupled directly to the motor 131 while planet wheel 137 is coupled to a bevel gear 140 meshing with another bevel gear 141, the shaft of the latter carrying both a pinion 142 and a pointer 143 co-operating with a scale 144. Pinion 142 mates with a worm 145 which normally locks the planet wheel 137 in position but enables its rotation either by hand or (as more fully described hereinafter) automatically.

It will thus be seen that immobilization of planet wheel 137 causes housing 139 and, with it, gear 134 to rotate at half the speed of planet wheel 136, but that the 2:1 step-up ratio between gears 134 and 135 results in synchronous rotation of both oscillators 130 and 130″. Each complete revolution of the oscillators causes their respective outputs to vary through one or more cycles of the sawtooth pattern shown in Fig. 2, the two outputs being, however, separated by a time lag $t$, or phase difference, which may be adjusted from zero to $t_{max}$ through rotation of the planet wheel 137 by means of the worm 145.

Since the time lag $t$ is a measure of the distance $r$ of the wanted target from the observer, the scale 144 which indicates this phase difference may be calibrated directly in terms of $r$.

A fixed oscillator 146 produces the constant frequency $F_0$ which together with the output of oscillator 129 is supplied to a modulator 147, the latter forming the sidebands $F_0+F$ and $F_0-F$ which are separated by a high-pass filter 148 and a low-pass filter 149. The output of filter 149 is combined with that of oscillator 130″ in a modulator 150 to produce the frequency $F_A''=F_0-F-f''$ while the output of filter 148 is combined with that of the same oscillator 130″ in a modulator 151 to produce the frequency $F_B=F_0+F-f''$.

A high-pass filter 152, having the cutoff frequency $F+f_1$, and a low-pass filter 153, having the cutoff frequency $F-f_1$, divide the output of receiving antenna 122 into two portions including the frequencies $F_A'=F+f'+f_x$ and $F_B'=F-f'+f_x$, respectively. The outputs of filter 152 and modulator 150 are combined in a modulator 154 to produce a bundle of frequencies which includes the frequencies $F_I=F_A''+F_A'$, the latter being selected therefrom by passing the output of modulator 154 through a narrow-band-pass filter 155 centered on frequency $F_0$. Similarly, the outputs of filter 153 and modulator 151 are combined in a modulator 156 to produce a bundle of frequencies from which the frequency $F_{II}=F_B''-F_B'$ is selected by passing the output of modulator 156 through another band pass filter 157 likewise centered on frequency $F_0$. Since the frequencies $F_I$ and $F_{II}$ differ only by $2f_x$, the outputs of filters 155 and 157 may now be differentially applied to an indicator 158 calibrated to show the radial velocity of an object whose azimuthal position lies within the sector covered by the radiation pattern of antennas 121, 122 and whose range is determined by the setting of pointer 142 with respect to scale 144. Discriminator circuits suitable to produce the desired indication from a comparison of two frequencies are well known and need not be described.

Since the time lag $t$ manually produced between the outputs of oscillators 130 and 130″ cannot be expected to equal exactly $2/c$ times the actual distance of the target from the observer, there may exist an appreciable frequency differential $\Delta f$ in the outputs of filters 155 and 157 which may be further increased by the radial displacement of the target. The magnitude of this differential may be determined by additively combining the outputs of the two filters in a modulator 159, thus producing a frequency $F_I+F_{II}=2F_0+2\Delta f$, and by comparing the latter frequency with the frequency $2F_0$ obtainable from a frequency doubler 160 which is coupled to oscillator 146. A range control circuit 161, to which the outputs of modulator 159 and of doubler 160 are differentially applied, may then be used to correct the setting of range indicator 143, 144, over a linkage schematically indicated at 162, until the difference $2\Delta f$ of these two outputs become zero; the system will thus be constantly readjusted to the actual range of the target $11_x$ and no further manual reacting will be necessary. Servo circuits adapted to fulfill the task of range control circuit 161 are sufficiently well known to require no further description.

The output of oscillating antenna 123 like that of antenna 122 includes the two frequencies $F_A'$ and $F_B'$, but detection of only one of these frequencies is necessary to obtain an indication of the tangential speed of the target. Thus there is shown by way of example a modulator 163 wherein the outputs of antenna 123 and modulator 150 are combined to produce a frequency $F_A''+F_A'$ that will pass through the narrow-band-pass filter 164 centered on $F_0$. The output of filter 164 has the form of roughly trapezoidal pulses, such as discussed in connection with Fig. 3, whose envelope may be detected by means of a detector following the filter 164.

A sweep control circuit 166, which may respond to signals from a timing circuit or to the antenna 123 reaching a limiting position and which may be of any of numerous types well known per se, alternately energizes and releases a relay 167 to reverse the polarity of the operating current applied to the motor 125 from a source 168, thereby periodically reversing the swing of the antenna 123. A differentiation circuit 169, which includes a transformer 170 with a secondary grounded at its midpoint and a pair of rectifiers 171, 172 connected to the extremities of this secondary, derives a pair of positive pulses, such as pulses 18a, 18b, and inverted pulses 19a, 19b (Fig. 3), from each trapezoidal pulse such as 14a, 14b obtained from the detector 165. The original pulses such as 14a, 14b are alternately applied to two integrating circuits 173a, 173b, comprising condensers 174a, 174b and resistors 175a, 175b, to which the detector 165 is selectively connected by the innermost lower armature of relay 167. Each of the integrating circuits 173a, 173b is associated with a respective pulse comparison circuit 176a, 176b to which the differentiation products from circuit 169 are alternately applied by the second-lowest armature of relay 167.

The pulse comparison circuits 176a, 176b are identical and comprise each a vacuum tube 177a, 177b, respectively, provided with two control grids and with a plate resistor having a grounded portion 178a, 178b whose ungrounded terminal is connected via a rectifier 179a, 179b to a time constant circuit including a condenser 180a, 180b and a resistor 181a, 181b, respectively. The polarity of the rectifiers 179a, 179b is such that the associated condenser 180a, 180b, respectively, will be charged negatively when the respective tube 177a, 177b conducts, but that the charge on the condenser will be trapped after the flow of space current through the resistor 178a, 178b, respectively, has ceased. The tubes are normally biased to cutoff by means of batteries 182a, 182b inserted in their cathode leads. The circuits 177a—181a and 177b—181b are, in effect, peak riding circuits or detectors similar to the one shown in Fig. 4 of my copending application Ser. No. 737,907, filed March 28, 1947, now Patent No. 2,530,081, granted November 14, 1950.

It will be noted that in the de-energized position of relay 167, which may be assumed to correspond to a counterclockwise swing of the antenna 123, the innermost lower armature of relay 167 connects the output of the detector 165 to the integrating circuit 173a, which in turn is connected to the upper control grid of tube 177a, while the second-lowest armature of the relay connects the differentiation circuit 169 to the lower grid of tubes 177b. The converse will be true during clockwise swings when, with the relay 167 energized, detector 165 is connected to integrating circuit 173b, which in turn is connected to the upper control grid of tube 177b, while differentiation circuit 169 is connected to the lower control grid of tube 177a.

When a pair of positive pulses produced by the differentiation circuit 169 is applied to one of the tubes, say to the tube 177a, then the latter becomes momentarily conductive and the upper terminal of resistor portion 178a reaches a negative potential, the condenser 180a becoming instantly charged to substantially the same potential over the low-resistance path provided by rectifier 179a. This procedure will be repeated during each clockwise swing of the antenna 123; at the same time, however, the magnitude of the space current through tube 177a will be co-determined by the biasing voltage applied to its upper control grid by the integrating circuit 173a, this biasing voltage being proportional to the integrated values of the pulses applied to the circuit 173a during counter-clockwise antenna swings. If counter-clockwise antenna swings, for example, produce pulses such as 14a', Fig. 3(c), while clockwise swings give rise to pulses such as 14b'', then the reduced area of the pulses 14a' and the lower amplitude of the derivatives 18b'', 19b'' will co-operate to decrease the voltage of condenser 180a while that of condenser 180b will be correspondingly increased by the larger area of pulses 14b'' in combination with the higher amplitude of derivatives 18a', 19a'. Thus it will be relatively simple to obtain an indication of the tangential velocity of the target $11_x$ by differentially connecting the condensers 180a, 180b across a suitable indicator 183.

It will again be desirable to provide follow-up means in order to avoid the need for manual re-adjustment whenever the target $11_x$ threatens to leave the beam 12. These means include a pair of beam centering circuits 184a, 184b respectively comprising two thyratrons 185a, 186a and 185b, 186b, a source of current 187a, 187b, a storage condenser 188a, 188b, a charging resistor 189a, 189b in series with a rectifier 190a, 190b, and a step-up transformer 191a, 191b having its primary in series with the source 187a, 187b, the resistor 189a, 189b, the rectifier 190a, 190b and the plate circuit of thyratron 185a, 185b, respectively, while having its secondary in series with the plate circuit of thyratron 186a, 186b, respectively, whose cathode is maintained more negative than that of the other thyratron 185a, 185b by means of a battery 192a, 192b, respectively.

A battery 193, connected to the lowermost armature of relay 167, applies a positive pulse to the grid of thyratron 185b, by way of a condenser 194b, when the relay operates (hence at the beginning of each clockwise swing of antenna 123) and to the grid of thyratron 185a, by way of a condenser 194a, when the relay releases (hence at the beginning of each counter-clockwise antenna swing). The pulse from differentiation circuit 169 are applied in the de-energized condition of the relay (hence during counter-clockwise swings) to the grid of thyratron 186a, by way of a coupling condenser 195a, and in the energized condition of the relay (hence during clockwise swings) to the grid of thyratron 186b, by way of a coupling condenser 195b. Thus the two circuits 184a, 184b will operate alternately and in the following manner:

When the antenna 123 reaches its leftmost position 123a (dot-dash lines), the relay 167 is energized and a positive pulse is applied to the grid of thyratron 185b which thus becomes conductive, causing the condenser 188b to discharge through the primary of transformer 191b. This discharge is virtually instantaneous and the thyratron immediately returns to its non-conductive state. The source 187b thereupon begins to measure the time between the antenna reversal and the arrival of a pulse 14b by charging the condenser 188b through resistor 189b and rectifier 190b. When the arrival of the pulse 14b produces a derivative pulse 18b at the differentiation circuit 169, this derivative pulse reaches the grid of thyratron 186b (in parallel with that of tube 177a) and ionizes the latter, thereby considerably increasing the voltage drop across resistor 189b and stopping the flow of charging current into the condenser 188b; it should be noted, however, that the rectifier 190b prevents the condenser from discharging through the thyratron 186b. The charge on condenser 188b thus remains substantially constant and the tube 186b continues to conduct current until a subsequent positive pulse on the grid of thyratron 185b, which discharges the condenser, sets up a reactive voltage drop across the secondary or transformer 191b which de-energizes the thyratron 186b.

Since the circuit 184a functions in the same manner during counter-clockwise antenna swings, i. e. after the antenna 123 has left its rightmost position 123b and the relay 167 has released, the two beam centering circuits will cause charges to accumulate on their respective storing condensers 188a, 188b the magnitude of which will be determined by the length of time elapsed between each swing reversal and the arrival of the pulse 14a or 14b immediately following. If, therefore, the pulse is equidistant from the limits of the scanning sweep (and, therefore, the position of the target is centered with respect to the major lobe of the directive pattern of antennas 121 and 122), the potentials of both condensers will be alike;

if, on the other hand, the pulse occurs during the earlier or the latter half of the sweep, a voltage difference of corresponding magnitude and polarity will exist which may be applied to an azimuth control circuit 196, the latter being connected via a linkage indicated schematically at 197 to the worm 127 for the purpose of automatically re-aligning the antenna system with the target by rotating the platform 126. Control circuits responsive to voltage differences are, of course, well known in the art and need not be further described.

In Fig. 5 only those parts of a tangential speed detector which are necessary for an understanding of certain modifications have been shown. Two continuously rotating receiving antenna arrays 223a, 223b, turning in opposite directions, are used; each comprises a plurality of individual directive antennas 224a, 224b, respectively, moving in unison and angularly spaced from each other by a uniform distance exceeding their beam width. Thus each array is shown here to comprise four individual antennas spaced 90° apart. The stationary collector segments 225a, 225b, swingable about the centers of their respective arrays 223a, 223b, are connected by a linkage 226 with the directive receiving antenna 222 serving for the control of the radial-speed indicator (not shown in Fig. 5). The angular extent of the segments 225a, 225b slightly exceeds the beam width of the rotating antennas, and the position of these segments may be changed together with that of antenna 222 (and of the transmitting antenna, not shown in Fig. 5, corresponding to antenna 121 in Fig. 4, unless an omnidirectional transmitting antenna is used) either manually or via link 297 under the control of azimuth control circuit 296.

The collector segments 225a, 225b co-operate with four contact brushes 227a, 227b, respectively, each of which is connected to an associated receiving antenna 224a, 224b by way of individual amplifiers 228a, 228b. This arrangement insures that each antenna is effectively connected in circuit only while its beam passes through a position of substantial alignment with that of antenna 222, whereby it will be possible to use the arrays 223a, 223b in combination with directive as well as with omnidirectional transmitters (the latter only if the directivity of the receiving antennas is high).

From each collector segment 225a, 225b a lead 229a, 229b extends to a modulator 263a, 263b, respectively, corresponding to the modulator 163 of Fig. 4. The modulators feed detectors 265a, 265b by way of narrow-band-pass filters 264a, 264b, respectively, centered on the frequency $F_0$, essentially in the manner described in connection with Fig. 4. The outputs of the detectors are applied to differentiation and inversion circuits 269a, 269b, each comprising a transformer 270a, 270b and rectifiers 271a, 272a and 271b, 272b, respectively, and to integrating circuits 273a, 273b.

The integrating circuit 273a and the differentiation circuit 269b are connected to different inputs of a pulse comparison circuit 276a, which may be similar to circuit 176a of Fig. 4, and the integrating circuit 273b as well as the differentiation circuit 269a are connected to different inputs of an identical pulse comparison circuit 276b. The outputs of the two pulse comparison circuits are used to control a tangential-speed indicator 283 as described in connection with Fig. 4.

The lead 229a is further connected through a choke coil 266 to a differentiation and inversion circuit comprising a transformer 267 with its secondary grounded at the center and a pair of rectifiers 271″, 272″ connected to the extremities thereof. The source of positive D.-C. potential of the amplifiers 228a, indicated at 293, sets up a positive pulse in the output of rectifier 271″ at the instant when a brush 227a makes contact with segment 225a and sets up a similar pulse in the output of rectifier 272″ when the brush leaves that segment; coke coil 266 prevents picked-up wave energy from reaching the transformer 267. Transformer 270a is provided with an additional secondary winding 270′ which is grounded at its center and has its extremities connected to rectifiers 271′, 272′, thereby producing positive pulses at the beginning and at the end of an incoming pulse such as 14a (Fig. 3). Since the rectifiers 271′ and 271″ are connected to a beam centering circuit 284a, which may be similar to the circuit 184a of Fig. 4, and since the rectifiers 272′ and 272″ are connected to an identical beam centering circuit 284b, these two circuits will measure the time from the beginning of an effective antenna sweep to the arival of a pulse and from the cessation of the pulse to the end of the sweep, respectively; it should be noted, however, that it will also be possible to reverse the connections so that the intervals measured are from the beginning of the sweep to the end of the pulse and from the beginning of the pulse to the end of the sweep, respectively. In either case effective centering and follow-up action will be had by differentially applying the outputs of the circuits 284a, 284b to the azimuth control circuit 296.

Fig. 5 also shows a modified arrangement for producing the frequency $F_A''$ (or $F_B''$) required to obtain a useful output at the filters 264a and 264b. An oscillator 236 produces a frequency $f_n$ which may be varied from zero to a maximum equal to $f_2 - f_1$ while a second oscillator 237 produces a frequency $f_p$ which may be varied from the same maximum down to zero. A link 262 gangs the two oscillators in such manner that the sum of their outputs will always be equal to $f_2 - f_1$.

An oscillator 230, which corresponds to oscillator 130 of Fig. 4, produces a continuously varying frequency $f$ which follows the sawtooth pattern of Fig. 2 and which is combined with the output of oscillator 236 in a modulator 238 and with that of oscillator 237 in a modulator 239. In order to prevent reversals in the lower sidebands produced by the modulators 238 and 239, the lower limit $f_1$ of frequency $f$ should not be less than half the upper frequency limit $f_2$. The motor (not shown in Fig. 5) that drives the oscillator 230 through its sawtooth cycles also varies the cutoff frequencies of a low-pass filter 240 and of a high-pass filter 241 in step therewith, filter 240 selecting the lower sideband from the output of modulator 238 while filter 241 selects the upper sideband from the output of modulator 239. Both filters work into a fixed band pass filter 242 which only passes the frequencies lying between $f_1$ and $f_2$, so that the component $f_n$ will be suppressed in the interval $t$ while the component $f_p$ will be suppressed in the interval $T-t$ for reasons that will be apparent from an inspection of Fig. 2. It may be mentioned, however, that the filter 242 is not absolutely necessary (although it may help to prevent false operation) since rejection of the unwanted component will also occur at the narrow band pass filters such as 264a and 264b; in fact, omission of the filter 242 will cause the frequencies $f+f_p$ and $f-f_n$ to assume values such that the differential $\Delta f$ will exist even in the short time interval $\Delta t$ previously referred to, as indicated in Fig. 2. A similar effect may be had by slightly enlarging the pass band of filter 242 beyond the limits $f_1$, $f_2$ through the addition of certain tolerances, e. g. by using the limits $f_1'$, $f_2'$ shown in Fig. 2. By this means an uninterrupted useful output is insured even if the system is not precisely trained upon the object under observation.

The setting of the oscillators 236 and 237 may be effected manually, or under the control of a range control circuit 261 via the link 262, and its extent may be read on an indicator shown here schematically as a scale 244 which may be calibrated in terms of distance $r$.

From the illustrations given it will be apparent that the invention may be embodied in numerous ways; thus it will be understood, for example, that the rotating antennas of Fig. 5 or the oscillating antenna of Fig. 4 may be directive transmitting rather than receiving antennas, in which case the pulses will be obtained from a stationary antenna (the counterpart of antenna 121 in Fig. 4) which may or may not have directive properties. An accurate indication of speed, which may be used, say, for purposes of observation at long range or of fire control at shorter distances, will in each case be obtainable by reason of the fact that all arbitrarily introduced frequency components cancel out in the result, and interference from parasitic sources will be minimized by virtue of the utilization of the outputs of two systems working in opposition to each other. It should be noted, therefore, that it will be possible to depart in a large variety of respects from the embodiments illustrated without thereby exceeding the scope of the invention as defined in the appended claims, and that more specifically the term "beam" as used in such claims applies to wave energy directively transmitted and/or directively received. It may also be mentioned that in an extreme case the frequency $F_0$ may assume the value zero (i. e. the oscillator 146 may be omitted), the associated filter (such as 152) then becoming a low-pass filter from which it will still be possible to obtain a useful output, indicative of the presence of a reflecting object at the appointed range, in view of the fact that the frequency differential $\Delta f$ will never completely disappear in practice.

I claim:

1. A radio location system comprising transmitting antenna means, receiving antenna means, a source of carrier frequency, variable oscillator means having two outputs, frequency control means varying the operating frequency of said variable oscillator means according to a sawtooth pattern, phase shifting means introducing a phase difference between the sawtooth patterns of said two outputs, first modulator means combining carrier energy from said source with one of the outputs of said variable oscillator means and applying at least one resulting sideband to said transmitting antenna means, a local oscillator, second modulator means combining carrier energy from said source with the other of the outputs of said variable oscillator means and producing a sideband corresponding, as to its location with respect to the associated carrier, to the sideband applied to said transmitting antenna means by said first modulator means, said second modulator means modulating oscillations from said local oscillator with said corresponding sideband, third modulator means combining the output of said receiving antenna means with that of said second modulator means, narrow-band pass filter means connected to the output of said third modulator means, the pass band of said filter means including the operating frequency of said local oscillator, and indicator means controlled by the output of said filter means.

2. A system according to claim 1 wherein said first modulator means applies both an upper and a lower sideband to said transmitting antenna means, said second modulator means being provided with two outgoing paths for frequencies above and frequencies below the operating frequency of said local oscillator, respectively, said third modulator means including a pair of modulators respectively receiving energy over said two paths, said filter means including two band pass filters respectively connected to said pair of modulators, said indicator means being differentially controlled by the outputs of said two filters.

3. A system according to claim 2, comprising frequency doubler means connected to said local oscillator, fourth modulator means additively combining the outputs of said band pass filters, and a control circuit differentially connected to the outputs of said frequency doubler means and of said fourth modulator means, said control circuit being connected to said phase shifting means and modifying the operation thereof in a sense tending to lead to a decrease in the frequency differential between the last-mentioned outputs.

4. A radio location system comprising transmitting antenna means having at least one antenna, receiving antenna means having at least one antenna, at least one of said antenna means being directive, sweep means for rotating the directive pattern of at least one antenna of said directive antenna means in one direction and for rotating the directive pattern of at least one antenna of said directive antenna means in the opposite direction, a source of outgoing waves connected to said transmitting antenna means, receiver means connected to said receiving antenna means, said receiver means comprising a first and a second channel, circuit means for connecting said antenna rotating in said one direction to said first channel and for connecting said antenna rotating in said opposite direction to said second channel, first and second pulse detector means in said first and said second channel, respectively, a pulse comparison circuit connected across the outputs of said two pulse detector means, and indicator means controlled by said pulse comparison circuit.

5. A system according to claim 4, comprising a pair of pulse integrating circuits inserted between said pulse comparison circuit and respective ones of said pulse detector means.

6. A system according to claim 4, comprising a pair of pulse differentiation circuits inserted between said pulse comparison circuit and respective ones of said pulse detector means.

7. A system according to claim 4, comprising a first pulse integrating circuit and a first pulse differentiation circuit both connected to the output of said first pulse detector means, and a second pulse integrating circuit and a second pulse differentiation circuit both connected to the output of said second pulse detector means, said pulse comparison circuit comprising a first vacuum tube having input electrode means connected to said first pulse integrating circuit and to said second pulse differentiation circuit, said pulse comparison circuit further comprising a second vacuum tube having input electrode means connected to said second pulse integrating circuit and to said first pulse differentiation circuit, each of said vacuum tubes being provided with output means including a respective detector circuit, said indicator means being differentially connected across said detector circuits.

8. A system for determining the presence of an object positioned a given distance from an observation point, comprising transmitter means at said observation point transmitting a high-frequency carrier wave, first oscillator means producing a progressively varying modulating frequency, first modulating means superimposing said modulating frequency upon said carrier wave prior to transmission thereof, second oscillator means producing a local oscillation including a fixed component as well as a component which progressively varies in frequency according to the pattern of said modulating frequency but with a predetermined time lag with respect thereto, receiver means at said observation point receiving reflected wave energy, second modulating means combining said local oscillation with the reflected wave energy received, and filter means energized from said second modulating means and having a narrow pass band which includes the frequency of said fixed component, said filter means producing an output in response to incoming waves reflected by an object positioned at a distance $r$ from said observation point substantially given as $r=ct/2$ wherein $t$ is said time lag and $c$ is the velocity of propagation of said carrier wave.

9. A system according to claim 8 wherein said first and second oscillator means include means causing said modulating frequency and said progressively varying component to vary according to a sawtooth pattern between an upper and a lower limiting frequency.

10. A system according to claim 9 wherein said second oscillator means comprises a selectively adjustable frequency source and means superimposing the output of said source upon said modulating frequency.

11. A system according to claim 10 wherein said second oscillator means further comprises a second frequency source and means superimposing the output of said second source, along with that of the first-mentioned source, upon said modulating frequency, said two sources being ganged together in a manner making the sum of their output frequencies equal to the difference of said upper and lower limiting frequencies.

12. A system for obtaining information on the motion of an object positioned a given distance from an observation point, comprising: transmitter means at said observation point transmitting outgoing waves including two sidebands $F_A = F+f$ and $F_B = F-f$ of a carrier modulated with a frequency $f$; first modulating means progressively varying the frequency $f$; oscillator means producing two local oscillations $F_A''$, $F_B''$ each representing an algebraic sum of the carrier frequency $F$, a fixed frequency component $F_0$ and a variable frequency component $f''$, the frequencies of said two oscillations differing in that the components $F$ and $f''$ are of the same sign in $F_A''$ but of opposite sign in $F_B''$; common control means for said first modulating means and said oscillator means causing the component $f''$ to vary in substantially the same manner as $f$ but with a predetermined time lag $t$ with respect thereto; receiver means at said observation point receiving reflected wave energy including waves reflected by an object positioned a distance $r$ from said observation point substantially given as $r = ct/2$ wherein $c$ is the velocity of propagation of the transmitted and reflected waves, the portion of received wave energy due to reflection by said object including a first incoming frequency of the form $F_A' = F+f'+f_x$ and a second incoming frequency of the form $F_B' = F-f'+f_x$, $f'$ following the pattern of $f$ but with a time lag approximately equal to $t$, $f_x$ being a component of a magnitude and sign determined by the magnitude and sense of the radial displacement, if any, of said object; first circuit means combining part of the received wave energy including said first incoming frequency with said first local oscillation in a manner giving rise to a first bundle of frequencies which includes a first resulting frequency $F_I$ comprising the components $F_0$, $\Delta f$ and $f_x$, $\Delta f$ being the difference of $f'$ and $f''$, but having no component related to $F$; second circuit means combining part of the received wave energy including said second incoming frequency with said second local oscillation in a manner giving rise to a second bundle of frequencies which includes a second resulting frequency $F_{II}$ comprising the same components $F_0$, $\Delta f$ and $f_x$ but having no component related to $F$; first and second filter means energized from said first and second circuit means, respectively, and having narrow pass bands centered on $F_0$, said first and second filter means passing the resulting frequencies $F_I$ and $F_{II}$, respectively, the two unknown components $\Delta f$ and $f_x$ being of the same sign in one and of opposite sign in the other of said resulting frequencies; and mixer means connected to said first and second filter means and combining the outputs thereof in a manner causing cancellation of one and isolation of the other of said unknown components.

13. A system according to claim 12 wherein said mixer means comprises a differential mixer producing a frequency $2f_x$ indicative of the radial speed of said object.

14. A system according to claim 12 wherein said mixer means comprises an additive mixer producing a composite frequency $2F_0 + 2\Delta f$, a source of oscillations of frequency $2F_0$, and a differential mixer combining said composite frequency with said frequency $2F_0$, thereby producing a frequency $2\Delta f$ indicative of the deviation of the actual distance between said point and said object from the value $ct/2$.

15. A system according to claim 14, further comprising means for varying the time lag $t$ in accordance with the sign and magnitude of $2\Delta f$ in a sense tending to reduce $\Delta f$ to zero.

References Cited in the file of this patent

UNITED STATES PATENTS

| | | |
|---|---|---|
| 2,421,394 | Schelleng | June 3, 1947 |
| 2,427,029 | Stearns | Sept. 9, 1947 |
| 2,435,615 | Varian | Feb. 10, 1948 |
| 2,444,031 | Busignies | June 29, 1948 |
| 2,445,213 | Evans | July 13, 1948 |
| 2,468,751 | Hansen | May 3, 1949 |
| 2,490,051 | Hardy | Dec. 6, 1949 |
| 2,518,864 | Carlson | Aug. 15, 1950 |
| 2,546,973 | Chatterjea | Apr. 3, 1951 |
| 2,570,235 | Higonnet | Oct. 9, 1951 |
| 2,612,636 | Rust et al. | Sept. 30, 1952 |

FOREIGN PATENTS

| | | |
|---|---|---|
| 627,550 | Great Britain | Aug. 11, 1949 |